US008792396B2

(12) United States Patent
Huy et al.

(10) Patent No.: US 8,792,396 B2
(45) Date of Patent: Jul. 29, 2014

(54) METHOD OF PRE-EQUALIZING A DATA SIGNAL BY TIME REVERSAL IN FDD

(75) Inventors: Dinh Thuy Phan Huy, Paris (FR); Jean-Marie Chaufray, Chatenay Malabry (FR)

(73) Assignee: France Telecom, Paris (FR)

( * ) Notice: Subject to any disclaimer, the term of this patent is extended or adjusted under 35 U.S.C. 154(b) by 337 days.

(21) Appl. No.: 13/318,297

(22) PCT Filed: Apr. 30, 2010

(86) PCT No.: PCT/FR2010/050826
§ 371 (c)(1),
(2), (4) Date: Oct. 31, 2011

(87) PCT Pub. No.: WO2010/128235
PCT Pub. Date: Nov. 11, 2010

(65) Prior Publication Data
US 2012/0057510 A1    Mar. 8, 2012

(30) Foreign Application Priority Data

May 7, 2009   (FR) .................................... 09 53066

(51) Int. Cl.
*H04B 7/005*    (2006.01)
(52) U.S. Cl.
USPC ............. 370/278; 455/63.1; 455/68; 375/231
(58) Field of Classification Search
None
See application file for complete search history.

(56) References Cited

U.S. PATENT DOCUMENTS

| 6,285,859 | B1 | 9/2001 | Fernandez Duran et al. ... 455/63 |
| 7,197,084 | B2 * | 3/2007 | Ketchum et al. .............. 375/296 |
| 7,738,593 | B2 * | 6/2010 | Howard ........................ 375/296 |
| 2003/0138053 | A1 * | 7/2003 | Candy et al. .................. 375/259 |
| 2005/0141459 | A1 | 6/2005 | Li et al. .......................... 370/334 |
| 2006/0098746 | A1 * | 5/2006 | Candy et al. .................. 375/259 |

(Continued)

FOREIGN PATENT DOCUMENTS

| EP | 0936781 | 8/1999 |
| WO | 2007103085 | 9/2007 |

OTHER PUBLICATIONS

Gesbert et al., "From Theory to Practice: An Overview of MMO Space-Time Coded Wireless Systems" IEEE Journal on Selected Areas in Communications, vol. 21, No. 3, Apr. 2003.

(Continued)

*Primary Examiner* — Brian Roberts
(74) *Attorney, Agent, or Firm* — David D. Brush; Westman, Champlin & Koehler, P.A.

(57) ABSTRACT

Pre-equalizing a data signal transmitted in frequency division duplex by an originating entity having a set of originating antennas to a destination entity having a set of destination antennas, including: transmitting a first pilot by a destination antenna; the originating entity estimating a first impulse response of a first channel; an iterative step including an originating antenna transmitting a second pilot modulated by the first impulse response; the destination entity estimating and time reversing a combined impulse response of the first and second channels; the destination antenna transmitting a third pilot modulated by the time-reversed response; estimating a composite response of the channels; re-iterating the iterative step for some originating antennas; and re-iterating the steps of transmitting a first pilot, estimating the first response, and the iterative step for some destination antennas; and determining pre-equalization coefficients for the data signal from a combination of a set of composite impulse responses.

10 Claims, 2 Drawing Sheets

(56) References Cited

U.S. PATENT DOCUMENTS

2007/0099571 A1    5/2007   Withers, Jr. et al. ....... 455/67.11
2007/0206504 A1    9/2007   Koo et al. ..................... 370/245
2010/0197264 A1*   8/2010   Azadet et al. ................ 455/272

OTHER PUBLICATIONS

Alamouti, "A Simple Transmit Diversity Technique for Wireless Communications" IEEE Journal on Select Areas in Communications, vol. 16, No. 8, Oct. 1998.

English Translation of the Written Opinion dated Nov. 4, 2010 for corresponding International Application No. PCT/FR2010/050826, filed Apr. 30, 2010.

English Translation of the International Preliminary Report on Patentability and Written Opinion dated Nov. 9, 2011 for corresponding International Application No. PCT/FR2010/050825, filed Apr. 30, 2010.

International Search Report and Written Opinion dated Jul. 27, 2010 for corresponding International Application No. PCT/FR2010/050825, filed Apr. 30, 2010.

International Search Report and Written Opinion dated Nov. 4, 2010 for corresponding International Application No. PCT/FR2010/050826, filed Apr. 30, 2010.

Tourin A. et al., "Time Reversal Telecommunications in Complex Environments" Comptes Rendus—Physique, Elsevier, Paris, FR, vol. 7, No. 7, Sep. 1, 2006, pp. 816-822, XP024978786.

Robert C. Qui ED—Anonymous: "A Theory of Time-Reversed Impulse Multiple-Input Multiple-Output (MIMO) for Ultra-Wideband (UWB) Communications" Ultra-Wideband, The 2006 IEEE 2006 International Conference in , IEEE, PI, Sep. 1, 2006, pp. 587-592, XP031007200.

Dahl T. et al., "Blind Beamforming in Frequency Division Duplex MISO Systems Based on Time Reversal Mirrors" Signal Processing Advances in Wireless Communications, 2005 IEEE $6^{th}$ Workshop on New York, NY, USA Jun. 2-8, 2005, Piscataway, NJ, USA, IEEE, Jun. 2, 2005, pp. 640-644, XP010834538.

Gomes J. et al., "Time-Reversed OFDM Communication in Underwater Channels" Signal Processing Advances in Wireless Communications, 2004 IEEE $5^{th}$ Workshop in Lisbon, Portugal Jul. 11-14, 2004, Piscataway, NJ, USA, IEEE, Jul. 11, 2004, pp. 626-630, XP010805978.

Patrice Pajusco et al., "Characterization of UWB Time Reversal Using Circular Array Measurements" wireless Technologies, 2007 European Conference in, IEEE, PI, Oct. 1, 2007, pp. 102-105, XP031190917.

* cited by examiner

METHOD OF PRE-EQUALIZING A DATA SIGNAL BY TIME REVERSAL IN FDD

CROSS-REFERENCE TO RELATED APPLICATIONS

This Application is a Section 371 National Stage Application of International Application No. PCT/FR2010/050826, filed Apr. 30, 2010 and published as WO 2010/128235 on Nov. 11, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a method of pre-equalizing a data signal, e.g. transmitted in a radio communications network based on frequency division duplex (FDD).

In an FDD type network, two communicating entities transmit data signals in distinct frequency bands. By way of example, the communicating entities are radio terminals, terrestrial base stations, satellite base stations, or indeed radio access points. The disclosure relates to radio communications networks of the single input single output (SISO) type for which the communicating entities have a single antenna, to multiple input multiple output (MIMO) type networks for which each of the communicating entities has a plurality of antennas, and networks that combine communicating entities having one antenna with communicating entities having a plurality of antennas of the single input multiple output (SIMO) type or the multiple input single output (MISO) type.

BACKGROUND OF THE DISCLOSURE

A radio signal transmitted by an antenna of a communicating entity, referred to as an antenna signal, is subjected to deformation as a function of propagation conditions between a point of origin defined at the outlet of the originating antenna and a destination point defined at the inlet of an antenna of the destination communicating entity. In order to limit such deformation, the antenna signal is previously distorted by applying pre-equalization coefficients as a function of the characteristics of the propagation channel between the two antennas. It is therefore necessary to characterize the propagation channel.

Amongst existing pre-equalization methods, there are methods that are based on time reversal that are distinguished by their low complexity and their high performance.

Time reversal is a technique for focusing waves, typically soundwaves, and it relies on the invariance of the wave equation to time reversal. Thus, a wave that is reversed in time propagates like a forward wave going backwards in time.

A short pulse transmitted from a point of origin propagates through a propagation medium. A portion of this wave as received by a destination point is time reversed before being returned into the propagation medium. The wave converges towards the point of origin where it re-forms a short pulse. The signal picked up at the point of origin is practically identical in terms of form to the originating signal transmitted from the point of origin. In particular, the time-reversed wave converges with accuracy that increases with increasing complexity of the propagation medium. The time reversal of the propagation channel as applied to the wave enables energy to be concentrated and cancels out the effect of the channel on a focal point when the wave as pre-distorted in this way is transmitted from the point of origin.

The time-reversal technique is thus applied to radio communications networks in order to cancel out the effect of the propagation channel on the antenna signal at a focal point, in particular by reducing the spreading of the channel by concentrating energy on the focal point, thereby simplifying the processing of symbols that are received after passing through the channel. The antenna signal transmitted by an antenna of the originating communicating entity is thus pre-equalized by applying coefficients obtained by time reversal of the impulse response of the propagation channel through which the antenna signal is to pass. Implementing time reversal thus requires the originating communicating entity to have knowledge about the propagation channel in the frequency band that is dedicated to communication coming from that entity.

However, when using transmission in FDD mode, transmission from a communicating entity referred to as an originating communicating entity to a destination communicating entity, and transmission in the opposite direction take place in distinct frequency bands. For example, in a radio communications system, this involves transmission in a first frequency band from a mobile radio terminal to a base station, said to be transmission in the "up" direction, and transmission in a second frequency and from a base station to a mobile radio terminal, said to be transmission in the "down" direction. Although a communicating entity can estimate a propagation channel on the basis of receiving a signal that has passed through the channel, it cannot estimate a propagation channel on the basis of a signal that has been transmitted in a different frequency band.

No reciprocity property concerning the transmission channel can be applied, unlike transmission in time division duplex (TDD) mode where sharing the same frequency band makes it simple to estimate the channel independently of transmission direction. It is therefore advantageous to have a technique for pre-equalizing antenna signals for use with transmission in FDD mode.

A first solution is proposed in the article entitled "From theory to practice: an overview of MIMO space-time coded wireless systems" by David Gesbert, Mansoor Shafi, Da-Shan Shiu, Peter J. Smith, and Aymon Naguib, and published in IEEE Journal on Selected Areas in Communication, Vol. 21, No. 3, in April 2003. The method proposed relies on time reversal as a pre-equalization technique in which the coefficients are evaluated from an estimate of the propagation channel performed by the destination communicating entity. The estimation is performed by the destination communicating entity on the basis of knowledge of pilots previously transmitted by the originating communicating entity. A quantification of the estimate of the propagation channel is then delivered to the originating communicating entity. Nevertheless, the quantification of the estimate of the propagation channel needs to be sufficiently efficient in order to guarantee that pre-equalization is effective. Furthermore, the radio resources needed for delivering the quantified estimate of the propagation channel increase with increasing accuracy of the quantification.

A compromise therefore needs to be reached between the accuracy of the quantification of the estimate of the propagation channel and consumption of radio resources used for transmitting the quantified estimate of the propagation channel.

SUMMARY

An embodiment of the invention proposes an alternative solution that offers a method of pre-equalization that is based on time reversal without requiring the destination entity to deliver a quantified estimate of a propagation channel. This solution is suitable for communicating entities having only one antenna in which the data signal comprises a single antenna signal, or for communicating entities having a plurality of antennas, in which a data signal is made up of a plurality of antenna signals.

An embodiment of the invention provides a method of pre-equalizing a data signal transmitted in frequency division duplex by an originating communicating entity having a set of originating antennas to a destination communicating entity having a set of destination antennas. The method comprises:

a step of transmitting a first pilot sequence by a destination antenna;

a step of the originating entity estimating a first impulse response of a first propagation channel between the destination antenna and a reference antenna of the set of originating antennas;

an iterative step comprising the substeps of:

an originating antenna transmitting a second pilot sequence modulated by the first impulse response;

the destination entity estimating a combined impulse response of the first propagation channel and of a second propagation channel between the originating antenna and the destination antenna;

time reversing the combined impulse response;

the destination antenna transmitting a third pilot sequence modulated by the time-reversed combined impulse response; and estimating a composite impulse response of the first and second propagation channels from the modulated third pilot signal as received by the reference antenna;

the iterative step being re-iterated for at least a portion of the set of originating antennas;

the steps of transmitting a first pilot sequence, of estimating the first impulse response, and the iterative step being re-iterated for at least a portion of the set of destination antennas; and a step of determining pre-equalization coefficients for the data signal from a combination of a set of composite impulse responses.

This method thus makes it possible to avoid using radio resources for transmitting an estimate of the propagation channel. Furthermore, no quantification is needed, thus making it possible to guarantee that pre-equalization is effective. The destination communicating entity releases the resources that were previously used for delivering the estimate(s) of the propagation channels without requiring complex analog or digital processing.

In the destination communicating entity, the complexity of the pre-equalizing method of an embodiment of the invention is thus limited to implementing time reversal of a combined impulse response and estimating the channel.

Furthermore, the pre-equalization coefficients are determined directly from a combination of a set of composite impulse responses. The method is independent of the various pre-coding and modulation methods that may be applied to the binary data generating a data signal having a plurality of antenna signals.

In addition, an embodiment of the invention applies equally well to SISO type radio communications networks in which the communicating entities have only one antenna, MIMO type networks in which the communicating entities have a plurality of antennas, and networks combining communicating entities having only one antenna with communicating entities having a plurality of antennas of the SIMO or MISO types.

In the step of estimating the impulse response of the first propagation channel, the method further includes selecting a reference antenna as a function of a set of pilot signals received by the set of originating antennas.

This selection thus makes it possible to select the first propagation channel as a function of characteristics of the received pilot signals, e.g. their spread in signal time.

In a particular embodiment, the reference antenna is selected as a function of the energies of the pilot signals received in the set of pilot signals received via the set of originating antennas.

For example, this selection thus serves to give priority to the first propagation channel in which signal energy is attenuated the least.

An embodiment of the invention also provides a device for pre-equalizing a data signal for a communicating entity referred to as an originating communicating entity having a set of originating antennas, said originating communicating entity being suitable for transmitting in frequency division duplex said signal to a destination communicating entity having a set of destination antennas. The device comprising means for:

receiving a first pilot signal transmitted by a destination antenna;

estimating a first impulse response of a first propagation channel between the destination antenna and a reference antenna;

transmitting via an originating antenna, a second pilot sequence modulated by the first impulse response;

estimating a composite impulse response of the first propagation channel and of a second propagation channel between the destination antenna and the originating antenna from a third pilot sequence transmitted by the destination antenna; and determining pre-equalization coefficients for the data signal from a combination of a set of composite impulse responses;

the means for emitting, receiving, and estimating being implemented iteratively for at least a portion of the set of destination antennas and at least a portion of the set of originating antennas.

An embodiment of the invention also provides a device for pre-equalizing a data signal for a destination communicating entity, the entity having a set of destination antennas and being suitable for receiving the data signal transmitted in frequency division duplex by an originating communicating entity having a set of originating antennas. The device comprises means for:

transmitting via a destination antenna a first pilot sequence to the originating communicating entity;

receiving a second pilot sequence transmitted by an originating antenna, the second sequence being modulated by a first impulse response of a first propagation channel between the destination antenna and a reference antenna;

estimating a combined impulse response of the first propagation channel and of a second propagation channel between the originating antenna and the destination antenna;

time reversing the combined impulse response; and transmitting a third pilot sequence modulated by the estimated time-reversed combined impulse response;

the means for transmitting, receiving, estimating, and time reversing being implemented iteratively for at least a portion of the set of destination antennas and at least a portion of the set of originating antennas.

An embodiment of the invention also provides a communicating entity of a radio communications system including at least one of the above-specified devices for pre-equalizing a data signal.

An embodiment of the invention also provides a radio communications system comprising at least one originating communicating entity and at least one destination communicating entity of an embodiment of the invention.

An embodiment of the invention also provides a computer program for a communicating entity, referred to as an originating communicating entity, the program including software instructions for controlling the implementation by the entity of those steps of the method of an embodiment of the invention that are implemented by the originating communicating entity when the program is executed by the originating communicating entity.

An embodiment of the invention also provides a computer program for a communicating entity, referred to as a destination communicating entity, the program including software instructions for controlling the implementation by the entity of those steps of the method of an embodiment of the invention that are implemented by the destination communicating entity when the program is executed by the destination communicating entity.

The devices, communicating entities, system, and computer programs present advantages analogous to those set out above.

BRIEF DESCRIPTION OF THE DRAWINGS

Other characteristics and advantages appear more clearly on reading the following description of particular implementations of the method of pre-equalizing a data signal and of associated communicating entities, given merely as non-limiting and illustrative examples, and with reference to the accompanying drawings, in which.

DETAILED DESCRIPTION OF ILLUSTRATIVE EMBODIMENTS

Figure 1:
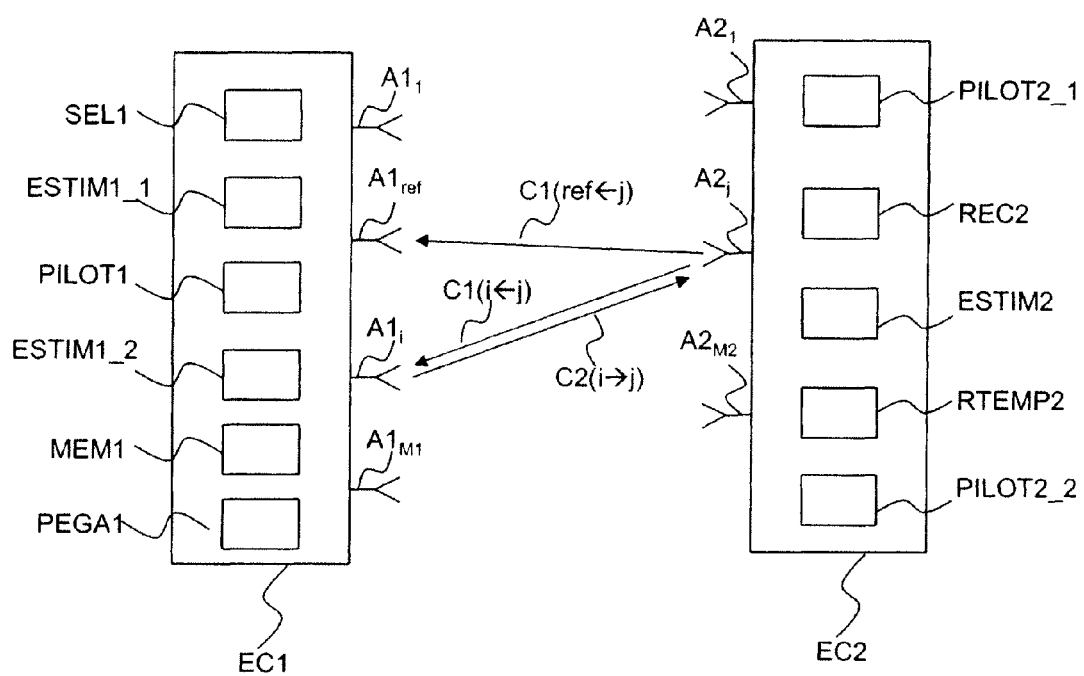
FIG. 1 is a diagrammatic block diagram of an originating communicating entity communicating with a destination communicating entity of an embodiment of the invention.

With reference to FIG. 1, an originating communicating entity EC1 is suitable for communicating with a destination entity EC2 via a radio communications network based on frequency division duplex (FDD), not shown in the figure. For example, the radio communications network is a cellular radio communications network of the universal mobile communications system (UMTS) type as defined by the 3rd generation partnership project (3GPP) specification organization and its evolutions including 3GPP-LTE (for "long term evolution").

The communicating entities may be mobile radio terminals or indeed terrestrial or satellite base stations, or indeed access points. In FDD mode, transmission from a base station to a mobile radio terminal in the so-called "down" channel takes place in a frequency band that is distinct from the frequency band dedicated to transmission from a mobile radio terminal to a base station in the so-called "up" channel. For reasons of clarity, an embodiment of the invention is described for unidirectional transmission of a data signal from the communicating entity EC1 to the communicating entity EC2, regardless of whether this is in the up direction or the down direction. An embodiment of the invention also relates to bidirectional transmission.

The originating communicating entity EC1 has M1 originating antennas ($A1_1, \ldots, A1_{ref}, \ldots, A1_i, \ldots, A1_{M1}$), where M1 is greater than or equal to 1. The destination communicating entity has M2 destination antennas ($A2_1, \ldots, A2_j, \ldots, A2_{M2}$) where M2 is greater than or equal to 1.

The destination communicating entity EC2 is suitable for transmitting a radio signal from at least one of any of the antennas $A2_j$ for 1 varying from 1 to M2 to the originating communicating entity EC1 in a first given frequency band. A first propagation channel C1(i←j) is defined between the antenna $A2_j$ of the communicating entity EC2 and an antenna $A1_i$ of the originating communicating entity EC1. Similarly, a first propagation channel C1(ref←j) is defined between the antenna $A2_j$ of the communicating entity EC2 and the antenna $A1_{ref}$ of the originating communicating entity EC1. M1×M2 first propagation channels C1(i←j) for i varying from 1 to M1 and j varying from 1 to M2 are thus defined between the communicating entities EC1 and EC2.

The originating communicating entity EC1 is suitable for transmitting a radio signal from at least any one of the antennas $A1_i$ for i varying from 1 to M1, to the destination communicating entity EC2 in a second frequency band distinct from the first. A second propagation channel C2(i→j) is defined between the antenna $A1_i$ of the communicating entity EC1 and an antenna $A2_j$ of the destination communicating entity EC2 for transmission from the communicating entity EC1 to the communicating entity EC2. M1×M2 second propagation channels C2(i→j) for i varying from 1 to M1 and j varying from 1 to M2 are thus defined between the communicating entities EC1 and EC2.

In FIG. 1, there are shown only those means that are associated with an embodiment of the invention and that are included in the originating communicating entity or in the destination communicating entity.

The originating and destination communicating entities also include respective central control units (not shown), to which the means shown are connected and which serve to control the operation of said means.

The originating communicating entity also includes a data signal generator having M1 antenna signals. Such antenna signals are defined from binary data by methods of modulation, coding, and sharing over the M1 antennas, e.g. as described in the article "Space block coding: a simple transmitter diversity technique for wireless communications", published in the IEEE Journal on Selected Areas in Communications, Vol. 16, pp. 1456-1458, October 1998, by S. Alamouti.

The originating communicating entity comprises:

a selective receiver SEL1 arranged to receive on the set of originating antennas $A1_i$ for i varying from 1 to M1 a first pilot sequence transmitted by the communicating entity EC2 and for selecting a reference antenna from the set of pilot signals received on the set of originating antennas;

a channel estimator ESTIM1_1 arranged to estimate a first impulse response of a first propagation channel from a pilot signal received on the reference antenna selected by the selective receiver SEL1;

a pilot sequence generator PILOT1 arranged to transmit a second pilot sequence modulated by the first impulse response delivered by the channel estimator ESTIM1. The modulated second pilot sequence is transmitted on a carrier frequency f1 of the frequency band dedicated to transmission from the communicating entity EC1 to the communicating entity EC2;

a channel estimator ESTIM1$_{-2}$ arranged to estimate a composite impulse response of the first propagation channel and of a second propagation channel from a third pilot sequence received by the reference antenna;

a memory MEM1 storing time-reversed composite impulse responses or corresponding transfer functions delivered by the channel estimator ESTIM1_2; and a pre-equalizer PEGA1 arranged to determine pre-equalization coefficients from a combination of time-reversed impulse responses or transfer functions stored in the memory MEM1.

The destination communicating entity comprises:

a pilot sequence generator PILOT2_1 arranged to transmit a first pilot sequence from a destination antennas $A2_j$ for $j$ varying from 1 to M2. The first pilot sequence is transmitted at a carrier frequency f2 of the frequency band dedicated to transmission from the communicating entity EC2 to the communicating entity EC1;

a receiver REC2 arranged to receive via a destination antenna a second pilot sequence modulated by a first impulse response of a first propagation channel, the modulated second pilot sequence being transmitted by the originating communicating entity;

a channel estimator ESTIM2 arranged to estimate a combined impulse response of the first propagation channel and of a second propagation channel from the received modulated second pilot sequence;

an impulse analyzer RTEMP2 arranged to time reverse the combined impulse response delivered by the channel estimator ESTIM2_1; and a pilot sequence generator PILOT2_2 arranged to transmit via a destination antenna a third pilot sequence modulated by the time-reversed combined impulse response delivered by the impulse analyzer RTEMP2. The modulated third pilot sequence is transmitted on a carrier frequency of the frequency band dedicated to transmissions from the communicating entity EC2 to the communicating entity EC1.

The various means of the originating and destination communicating entities may be implemented by analog or digital techniques that are well known to the person skilled in the art.

Figure 2:
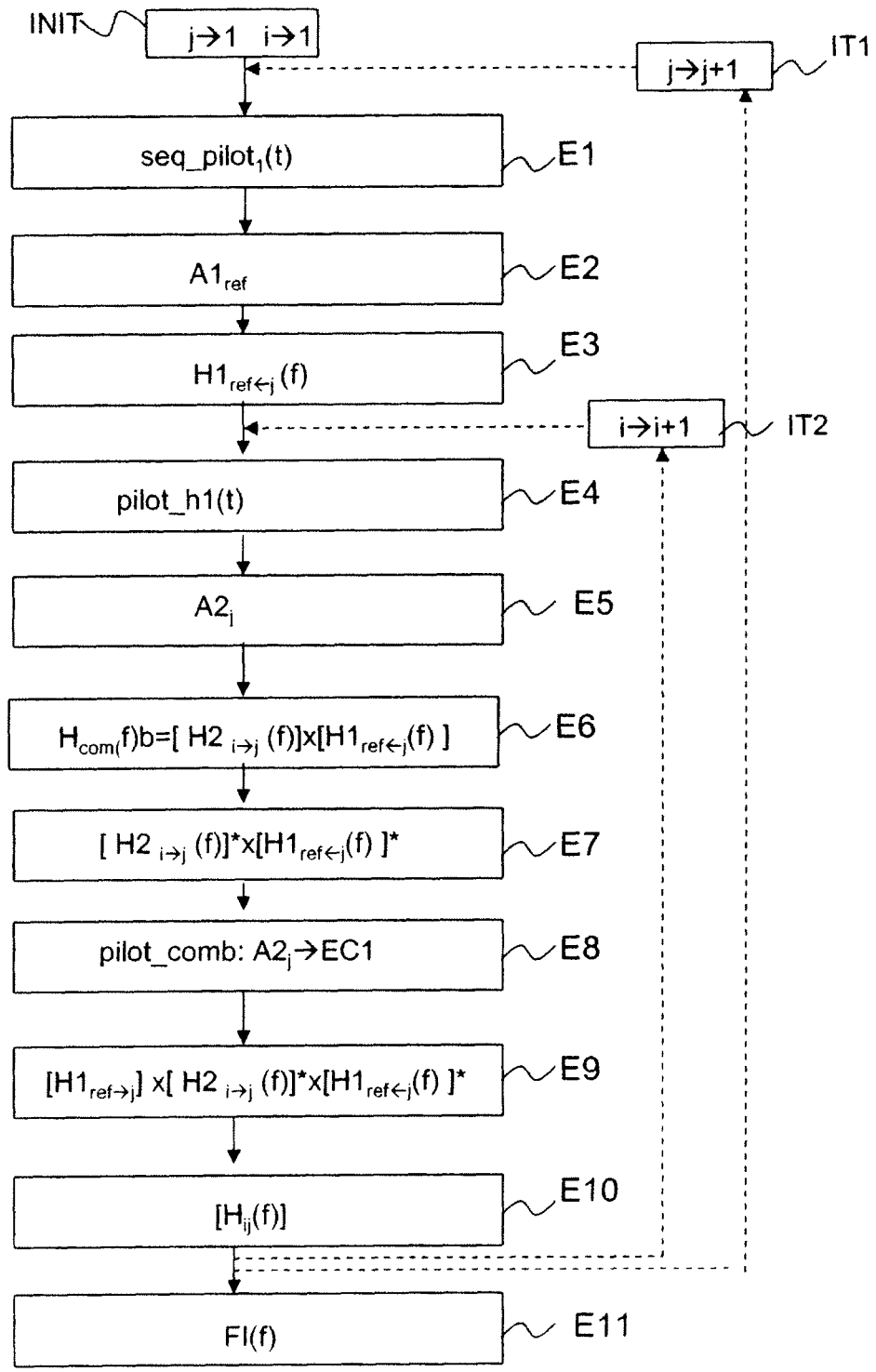
FIG. 2 shows the steps of the method of pre-equalizing a data signal in a particular implementation.

With reference to FIG. 2, the method of an embodiment of the invention for pre-equalizing a data signal comprises steps E1 to E11, a portion of the steps being executed in the originating communicating entity EC1 and the other portion in the destination communicating entity EC2. In this example, the results of the steps are described in the frequency domain, but they can be transposed directly into the time domain, given the following definitions.

An impulse response is defined by a function ri(t), which is a function of time $t$, with the transfer function being given by RI(f), which is a function of frequency $f$. The convolution product of impulse responses corresponds to the product of the corresponding transfer functions. A time-reversed impulse response ri(t) is written ri(−t) and the corresponding transfer function is written RI(f)*, the conjugate of the transfer function RI(f).

Steps E1 to E10 are re-iterated for at least a portion of the set of destination antennas. The iterations are symbolized by an initialization step NIT and a step IT1 of incrementing the index $j$ of the destination antennas $A1_j$. One iteration of the steps E1 to E10 is thus described for one of the destination antennas $A2_j$, $j$ varying from 1 to M2.

In step E1, the pilot sequence generator PILOT2_1 of the destination communicating entity generates a first pilot sequence seq_pilot$_1$(t). This first pilot sequence is transmitted by the antenna $A2_j$ on a carrier frequency f2 of the frequency band dedicated to transmission from the communicating entity EC2 to the communicating entity EC1.

In the following step E2, the selective receiver SEL1 of the originating communicating entity receives on the set of originating antennas the first pilot sequence as transmitted by the destination communicating entity EC2. The selective receiver determines a reference antenna from the set of pilot signals received on the set of originating antennas. By way of example, it makes its selection by comparing the energies received on the various originating antennas and selecting the received pilot signal having the maximum energy. In a second example, the selective receiver selects the antenna for which the received pilot signal is the least spread in time. In another example, the selective receiver may also select an antenna randomly.

The selective receiver delivers the pilot signal received on the reference antenna to the channel estimator ESTIM1_1 of the originating communicating entity.

In step E3, the channel estimator ESTIM1_1 acts on the pilot signal delivered by the selective receiver to estimate a first impulse response $h1_{ref \leftarrow j}(t)$ or in equivalent a transfer function $H1_{ref \leftarrow j}(f)$, for a first propagation channel C1(ref←j) between the destination antenna $A2_j$ and the reference antenna $A1_{ref}$. The estimation is performed on the basis of knowledge of the first pilot sequence transmitted by the destination antenna $A2_j$ using any channel estimation method well known to the person skilled in the art, e.g. using one of the methods described in the work entitled "Digital communications" by John G. Proakis and Masoud Saheli, published in November 2007 by Mc Graw-Hill.

Steps E4 to E10 are then re-iterated for at least a portion of the set of originating antennas. The iterations are symbolized by the initialization step NIT and the step IT2 of incrementing the index i of the originating antennas $A1_i$. One iteration of the steps E4 to E10 is thus described for one originating antenna $A1_i$, for $i$ varying from 1 to M1.

In step E4, the pilot sequence generator PILOT1 transmits a second pilot sequence seq_pilot$_2$(t) modulated by the impulse response $h1_{ref \leftarrow j}(t)$ of the first propagation channel C1(ref←j) as delivered by the channel estimator ESTIM1_1. The modulated second pilot sequence pilot_h1($t$) is given by:

$$\text{pilot\_}h1(t) = \text{seq\_pilot}_2(t) * h1_{ref \leftarrow j}(t)$$

where the operator * designates the convolution product.

The modulated second pilot sequence is transmitted on a carrier frequency f1 dedicated to transmission from the communicating entity EC1 to the communicating entity EC2 in accordance with the basic principle of transmission in FDD mode. The modulated second pilot sequence is then transmitted via the antenna $A1_i$ to the destination communicating entity.

In step E5, the receiver REC2 of the destination communicating entity EC2 receives from the set of destination antennas the modulated second pilot sequence transmitted by the originating antenna $A1_i$. The receiver delivers the pilot signal received on the destination antenna $A2_j$ to the channel estimator ESTIM2 of the destination communicating entity.

In step E6, the channel estimator ESTIM2 acts on the pilot signal delivered by the receiver REC2 to estimate a combined impulse response $h_{comb}(t)$ of the first propagation channel and of a second propagation channel C2(i→j) between the originating antenna $A1_i$ and the destination antenna $A2_j$. The estimation is performed on the basis of knowledge of the second pilot sequence, using any channel estimation method well known to the person skilled in the art, e.g. as mentioned above. In equivalent manner, the channel estimator estimates the corresponding combined transfer function $h_{comb}(f)$ given by:

$$H_{comb}(f) = H2_{i \to i}(f) \times H1_{ref \to j}(f)$$

the transfer function $H2_{i \to j}(f)$ being representative of the second propagation channel between the originating antenna $A1_i$ and the destination antenna $A2_j$.

In step E7, the impulse analyzer RTEMP2 performs time reversal of the combined impulse response $h_{comb}(t)$. For this purpose, the impulse analyzer stores the combined impulse response $h_{comb}(t)$, e.g. storing the coefficients of the combined impulse response and classifying the conjugates thereof in an order opposite to the order of the coefficients of $h_{comb}(t)$. The transfer function of the time-reversed combined impulse response $h_{comb}(-t)$ is thus given by:

$$H_{comb}(f)^* = [H2_{i \to i}(f)]^* \times [H1_{ref \to j}(f)]^*$$

In another example, the impulse analyzer analyzes the combined impulse response $h_{comb}(t)$ by an analog separator and deduces therefrom a discrete model of the combined impulse response. The analyzer then time reverses on the basis of the discrete model.

The impulse analyzer then delivers the impulse response $h_{comb}(-t)$ to the transmitter EMET2 of the destination communicating entity.

In step E8, the pilot sequence generator PILOT2_2 transmits via the antenna $A2_j$ to the originating communicating entity a third pilot sequence $seq\_pilot_3(t)$ modulated by the time-reversed combined impulse response $h_{comb}(-t)$.

The modulated third pilot sequence $pilot\_comb(t)$ is given by: $pilot\_comb(t) = seq\_pilot_3(t) * h_{comb}(-t)$ The modulated third sequence is transmitted on a carrier frequency of the frequency band dedicated to transmission from the communicating entity EC2 to the communicating entity EC1 in application of the basic principle of FDD mode.

In step E9, the originating communicating entity receives from the set of originating antennas the modulated third pilot sequence transmitted by the destination antenna $A2_j$.

The channel estimator ESTIM1_2 acts on the pilot signal received on the reference antenna to estimate a composite impulse response $h_{ij}(t)$ of the first and second propagation channels C1(ref←j) and C2(i→j) respectively. The channel is estimated from knowledge of the third pilot sequence by using any estimation method well known to the person skilled in the art, e.g. as mentioned above. The composite impulse response is given by the convolution product of the estimated impulse response of the first propagation channel $h1_{ref \to j}(t)$ by the time reversal of the combined impulse response.

In equivalent manner, the channel estimator estimates the corresponding composite transfer function $H_{ij}(f)$ as given by:

$$H_{ij}(f) = H1_{ref \to j}(f) \times [H2_{i \to j}(f)]^* \times [H1_{ref \to j}(f)]^*$$

In other words, the composite transfer function can also be written:

$$H_{ij}(f) = H1_{ref \to j}(f) \times [H_{comb}(f)]^*$$

In step E10, the channel estimator ESTIM2 then delivers the coefficients of the composite transfer function $H_{ij}(f)$, or in equivalent manner the corresponding composite impulse response $h_{ij}(t)$, to the memory MEM1 of the originating communicating entity.

The steps E1 to E10 are re-iterated for a portion of the destination antennas, and an iteration comprising a re-iteration of steps E4 to E10 for a portion of the originating antennas, the memory MEM1 of the originating communicating entity including a stored set of composite transfer functions or of composite impulse responses. For iterations performed on M1 destination antennas and M2 originating antennas, the memory MEM1 has composite transfer functions $H_{ij}(f)$ for i varying from 1 to M1 and j varying from 1 to M2.

In step E11, the pre-equalizer PEGA1 of the originating communicating entity determines pre-equalization coefficients for a data signal $S(t)$ having M1 antenna signals $[S_1(t), \ldots S_i(t), \ldots, S_{M1}(t)]$ from a combination of composite transfer functions $H_{ij}(f)$ in order to form a set FI of M1 pre-equalization filters $FI_i(f)$, for i varying from 1 to M1. The antenna signal $S_i(t)$ transmitted via the antenna $A1_i$ is thus shaped by applying the corresponding filter $FI_i(f)$ given by:

$$FI_i(f) = \sum_{j=1}^{M2} C_j H_{ij}(f)$$

The weighting coefficients $C_j$ for j varying from 1 to M2 are configurable parameters. They are determined as a function of the method used for generating a data signal. By way of example, these parameters are updated whenever the destination antenna is switched off or on, or as a function of variation in the state of the propagation channels over time.

After step E11, the data signal is thus pre-equalized by filtering each of the antenna signals with the corresponding filter from the set FI and transmitted by the communicating entity EC1 to the communicating entity EC2.

In a particular implementation, steps E4 to E10 are performed only for a single originating antenna A1, in the set of originating antennas. This implementation corresponds to the situation in which the data signal that is to be equalized is the antenna signal $S_i(t)$. The memory MEM1 of the originating communicating entity has M2 composite transfer functions $H_{ij}(f)$ for j varying from 1 to M2. The pre-equalizer PEGA1 determines a single pre-equalization filter $FI_i(f)$. The antenna signal $S_i(t)$ transmitted via the antenna $A1_i$ is thus shaped by applying the corresponding filter $FI_i(f)$ given by:

$$FI_i(f) = \sum_{j=1}^{M2} C_j H_{ij}(f)$$

In a particular implementation, the set of destination antennas has only one destination antenna $A2_1$. The succession of steps E1 to E10 is implemented only for transmission of a single first pilot sequence via the antenna $A2_1$ of the destination communicating entity. The steps E4 to E10 are re-iterated for at least a portion of the originating antennas of the originating communicating entity.

As an illustrative example in which the steps E4 to E10 are re-iterated for all of the originating antennas, in step E11, the pre-equalizer determines the pre-equalization coefficients as a function of M1 composite transfer functions $H_{i1}(f)$ for i varying from 1 to M1. The set FI of M1 pre-equalization filters $FI_i(f)$ for application to the data signal is given by:

$$FI = [FI_1(f), \ldots, FI_i(f), \ldots, FI_{M1}(f)]$$

with:

$$FI_i(f) = H_{i1}(f)$$

In a particular implementation, the set of originating antennas has only one originating antenna $A1_1$. The data signal then comprises only one antenna signal $S_1(t)$ transmitted by the single antenna $A1_1$, and the reference antenna is the originating antenna $A1_1$. The steps E4 to E10 are carried out only for said single antenna $A1_1$ of the originating communicating entity.

As an illustrative example in which the steps E1 to E10 are re-iterated for all of the destination antennas, in step E11, M2 composite transfer functions $H_{1j}$ are available for $j$ varying from 1 to M2. The pre-equalizer determines a single pre-equalization filter $FI_1(f)$ that is applied to the data signal from the M2 coefficients $C_j$, such that:

$$FI_1(f) = \sum_{j=1}^{M2} C_j H_{1j}(f)$$

In a particular embodiment, the set of originating antennas has only one originating antenna $A1_1$ and the set of destination antennas has only one destination antenna $A2_1$. The data signal then has only one antenna signal $S_1(t)$ transmitted by the single antenna $A1_1$ and the reference antenna of the originating entity is the antenna $A1_1$. In step E11, the transfer function $H_{11}$ determines a single pre-equalization filter $FI_1(f)$ given by:

$$FI_1(f) = H_{11}(f)$$

In a particular embodiment, for the originating communicating entity having M1 originating antennas and for the destination communicating entity having M2 destination antennas, the step E11 of determining the pre-equalization coefficient of the data signal having M1 antenna signals is implemented after iterating steps E1 to E10 without intermediate iteration of steps E4 to E10. An iteration of steps E1 to E10 is then performed for all originating and destination antenna pairs $(A1_i, A2_j)$, for $i$ varying from 1 to M1 and $j$ ranging form 1 to M2.

In the various embodiments described, the iteration loops are performed on a portion of the destination antennas and on a portion of the originating antennas. The number of antennas and which antennas are selected constitutes considerable parameters of the method. By way of example they may be determined as a function of characteristics of the antennas.

Furthermore, the first and/or second and/or third pilot sequences may be selected to be identical.

The method may also be implemented for bidirectional transmission. In this particular implementation, the method is implemented in the up direction or the down direction so that transmission of a pilot sequence by one antenna and transmission of an antenna signal by the communicating entity do not take place simultaneously.

An embodiment of the invention described here relates to a device for pre-equalizing a data signal for use in an originating communicating entity. Consequently, an embodiment of the invention also applies to a computer program, in particular a computer program on or in a data recording medium, and suitable for implementing an embodiment of the invention. The program may use any programming language, and it may be in the form of source code, object code, or code intermediate between source code and object code such as in a partially compiled form, or in any other desirable form for implementing those of the steps of the method of an embodiment of the invention that are performed in the originating communicating entity.

An embodiment of the invention described herein also relates to a device for pre-equalizing a data signal for use in a destination communicating entity. Consequently, an embodiment of the invention also applies to a computer program, in particular a computer program on or in a data recording medium, and suitable for implementing an embodiment of the invention. The program may use any programming language, and it may be in the form of source code, object code, or code intermediate between source code and object code, such as in a partially compiled form, or in any other desirable form for implementing those of the steps of the method of an embodiment of the invention that are performed in the destination communicating entity.

Although the present disclosure has been described with reference to one or more examples, workers skilled in the art will recognize that changes may be made in form and detail without departing from the scope of the disclosure and/or the appended claims.

The invention claimed is:

1. A method of pre-equalizing a data signal transmitted in frequency division duplex by an originating communicating entity having a set of originating antennas to a destination communicating entity having a set of destination antennas, the method comprising:
   a step of transmitting a first pilot sequence by a destination antenna;
   a step of the originating entity estimating a first impulse response of a first propagation channel between the destination antenna and a reference antenna of the set of originating antennas;
   an iterative step comprising the substeps of:
      an originating antenna transmitting a second pilot sequence modulated by said first impulse response;
      the destination entity estimating a combined impulse response of said first propagation channel and of a second propagation channel between the originating antenna and the destination antenna;
      time reversing said combined impulse response;
      the destination antenna transmitting a third pilot sequence modulated by said time-reversed combined impulse response; and
      estimating a composite impulse response of said first and second propagation channels from said modulated third pilot signal as received by the reference antenna;
   said iterative step being re-iterated for at least a portion of the set of originating antennas;
   said steps of transmitting a first pilot sequence, of estimating said first impulse response, and said iterative step being re-iterated for at least a portion of the set of destination antennas; and
   a step of determining pre-equalization coefficients for the data signal from a combination of a set of composite impulse responses.

2. The method according to claim 1, wherein the step of estimating the first impulse response of the first propagation channel includes selecting the reference antenna as a function of a set of pilot signals received by the set of originating antennas.

3. The method according to claim 2, wherein the reference antenna is selected as a function of energies of the pilot signals received from the set of pilot signals received by the set of originating antennas.

4. A device for pre-equalizing a data signal for a communicating entity referred to as an originating communicating entity, the entity having a set of originating antennas, said originating communicating entity being suitable for transmitting said signal in frequency division duplex to a destination communicating entity having a set of destination antennas, said device comprising:

a receiver configured to receive a first pilot signal transmitted by a destination antenna;
a channel estimator configured to estimate a first impulse response of a first propagation channel between the destination antenna and a reference antenna;
a pilot sequence generator configured to transmit via an originating antenna, a second pilot sequence modulated by said first impulse response;
a channel estimator configured to estimate a composite impulse response of said first propagation channel and of a second propagation channel between the destination antenna and the originating antenna from a third pilot sequence transmitted by the destination antenna; and
a pre-equalizer configured to determine pre-equalization coefficients for the data signal from a combination of a set of composite impulse responses;
the receiver, channel estimators, and pilot sequence generator being implemented iteratively for at least a portion of the set of destination antennas and at least a portion of the set of originating antennas.

5. A device for pre-equalizing a data signal for a communicating entity referred to as a destination communicating entity and having a set of destination antennas, said destination communicating entity being suitable for receiving said data signal transmitted in frequency division duplex by an originating communicating entity having a set of originating antennas, said device comprising:
a first pilot sequence generator configured to transmit via a destination antenna a first pilot sequence to the originating communicating entity;
a receiver configured to receive a second pilot sequence transmitted by an originating antenna, said second sequence being modulated by a first impulse response of a first propagation channel between the destination antenna and a reference antenna;
a channel estimator configured to estimate a combined impulse response of said first propagation channel and of a second propagation channel between the originating antenna and the destination antenna;
an impulse analyzer configured to time-reverse the combined impulse response; and
a second pilot sequence generator configured to transmit a third pilot sequence modulated by said estimated time-reversed combined impulse response;
the first and second pilot sequence generators, the receiver, the channel estimator and the impulse analyzer being implemented iteratively for at least a portion of the set of destination antennas and at least a portion of the set of originating antennas.

6. A communicating entity of a radio communications system including at least one device according to claim 4.

7. A communicating entity of a radio communications system including at least one device according to claim 5.

8. A radio communications system comprising:
at least one originating communicating entity comprising a set of originating antennas and a first device configured to pre-equalize a data signal transmitted by the originating communicating entity in frequency division duplex to a destination communicating entity having a set of destination antennas, said first device comprising:
a receiver configured to receive a first pilot signal transmitted by a destination antenna;
a channel estimator configured to estimate a first impulse response of a first propagation channel between the destination antenna and a reference antenna;
a pilot sequence generator configured to transmit via an originating antenna, a second pilot sequence modulated by said first impulse response;
a channel estimator configured to estimate a composite impulse response of said first propagation channel and of a second propagation channel between the destination antenna and the originating antenna from a third pilot sequence transmitted by the destination antenna; and
a pre-equalizer configured to determine pre-equalization coefficients for the data signal from a combination of a set of composite impulse responses:
the receiver, channel estimators, and pilot sequence generator being implemented iteratively for at least a portion of the set of destination antennas and at least a portion of the set of originating antennas; and
at least one destination communicating entity referred to as the destination communicating entity and comprising a second device, said second device comprising:
a first pilot sequence generator configured to transmit via the destination antenna the first pilot sequence to the originating communicating entity;
a receiver configured to receive the second pilot sequence transmitted by the originating antenna, said second sequence being modulated by the first impulse response;
a channel estimator configured to estimate a combined impulse response of said first propagation channel and of the second propagation channel between the originating antenna and the destination antenna;
an impulse analyzer configured to time reverse the combined impulse response; and
a second pilot sequence generator configured to transmit the third pilot sequence modulated by said estimated time-reversed combined impulse response;
the first and second pilot sequence generators, the receiver, and the impulse analyzer being implemented iteratively for at least a portion of the set of destination antennas and at least a portion of the set of originating antennas.

9. A non-transitory data recording medium comprising a computer program recorded thereon, the program including software instructions for implementing a method of pre-equalizing a data signal transmitted in frequency division duplex by an originating communicating entity having a set of originating antennas to a destination communicating entity having a set of destination antennas, when the program is executed by the originating communicating entity, wherein the method comprises:
a step of transmitting a first pilot sequence by a destination antenna;
a step of the originating entity estimating a first impulse response of a first propagation channel between the destination antenna and a reference antenna of the set of originating antennas;
an iterative step comprising the substeps of:
an originating antenna transmitting a second pilot sequence modulated by said first impulse response;
the destination entity estimating a combined impulse response of said first propagation channel and of a second propagation channel between the originating antenna and the destination antenna;
time reversing said combined impulse response;
the destination antenna transmitting a third pilot sequence modulated by said time-reversed combined impulse response; and estimating a composite impulse response of said first and second propagation channels from said modulated third pilot signal as received by the reference antenna;

said iterative step being re-iterated for at least a portion of the set of originating antennas;

said steps of transmitting a first pilot sequence, of estimating said first impulse response, and said iterative step being re-iterated for at least a portion of the set of destination antennas; and a step of determining pre-equalization coefficients for the data signal from a combination of a set of composite impulse responses.

10. A non-transitory data recording medium comprising a computer program recorded thereon, the program including software instructions for implementing a method for pre-equalizing a data signal for a destination communicating entity when the program is executed by the destination communicating entity, said destination communicating entity having a set of destination antennas and being suitable for receiving said data signal transmitted in frequency division duplex by an originating communicating entity having a set of originating antennas, wherein the method comprises:

transmitting via a destination antenna a first pilot sequence to the originating communicating entity;

receiving a second pilot sequence transmitted by an originating antenna, said second sequence being modulated by a first impulse response of a first propagation channel between the destination antenna and a reference antenna;

estimating a combined impulse response of said first propagation channel and of a second propagation channel between the originating antenna and the destination antenna;

time reversing the combined impulse response; and transmitting a third pilot sequence modulated by said estimated time-reversed combined impulse response;

wherein transmitting, receiving, estimating, and time reversing are implemented iteratively for at least a portion of the set of destination antennas and at least a portion of the set of originating antennas.

* * * * *